Aug. 10, 1965  T. L. MACLEOD ETAL  3,199,197
OPTICAL DEVICE FOR DETERMINING THE SIZE OF A SURFACE
OBJECT FROM AN AIRCRAFT
Filed Nov. 28, 1961  3 Sheets-Sheet 1

INVENTORS
THOMAS L. MACLEOD JR.
JAMES J. TOLAN JR.
BY
AGENT
ATTORNEY

INVENTORS
THOMAS L. MACLEOD JR.
JAMES J. TOLAN JR.

Aug. 10, 1965 — T. L. MACLEOD ETAL — 3,199,197
OPTICAL DEVICE FOR DETERMINIMG THE SIZE OF A SURFACE
OBJECT FROM AN AIRCRAFT
Filed Nov. 28, 1961 — 3 Sheets-Sheet 3

*INVENTORS*
THOMAS L. MACLEOD JR.
JAMES J. TOLAN JR.
BY
*AGENT*
*ATTORNEY*

3,199,197
OPTICAL DEVICE FOR DETERMINING THE SIZE
OF A SURFACE OBJECT FROM AN AIRCRAFT
Thomas L. MacLeod, Pacific Palisades, and
James J. Tolan, Jr., Long Beach, Calif.
Filed Nov. 28, 1961, Ser. No. 155,509
4 Claims. (Cl. 33—64)
(Granted under Title 35, U.S. Code (1952), sec. 266)

The invention described herein may be manufactured and used by or for the Government of the United States of America for governmental purposes without the payment of any royalties thereon or therefor.

The present invention relates in general to apparatus for facilitating the determination by an observer in an aircraft having a known altitude of the size of an object on the surface of the ground or one which is floating in a body of water. More particularly, the invention is directed to apparatus for accurately measuring from an aircraft some particular dimension (such, for example, as the length) either of a moving object such as a ship or of a stationary object such as a ground-based military installation.

At the present time there are two methods in general use by which some particular dimension of the surface object may be determined by an observer in an aircraft. Perhaps the most widely used of these methods is for the observer to make a number of practice flights over an object having a known length so that a mental picture may be obtained of the length of the object for the particular altitude of the aircraft at the time the observation is made. This mental image then becomes a "standard" for future observations at this altitude and all determinations are made by comparison therewith. Obviously this method leads to wide variations in the validity of the data obtained, since the accuracy of the estimation depends largely upon the ability of the observer to retain the mental picture previously derived and to carry this over into situations where environmental conditions may be quite different from those under which his "standard of comparison" was acquired.

The other method in general use is the so-called "rule of thumb" often employed in photography, where the observer lines up the object to be measured with his thumb and, if the object is covered thereby, it is determined to be shorter or smaller than an arbitrary standard. However, this procedure again leads to highly inaccurate results, and cannot be relied upon to the degree often required in military operations.

The problem of accurately determining the size of a surface object from an aircraft is particularly acute when it becomes necessary to distinguish between legitimate targets at sea and natural phenomena which closely resemble such targets in general appearance. For example, it is extremely difficult to accurately identify a submarine as such in a region where whales can be found. Inability to arrive at an accurate whale vs. submarine determination has resulted in the accidental killing of many whiles, and this unfortunate situation could be avoided if an accurate means for measuring the object is made available. The great majority of whales have a length of under one hundred feet, and hence if this figure could be used as a criterion, much of the uncertainty as to the proper category into which a floating object falls would disappear.

It is consequently an objective of the present invention to place in the hands of an airborne observer a simple device which can be employed to measure with a relatively high degree of accuracy some particular dimension (such as the length) of a floating object or ground-based installation. The data thus obtained will facilitate the correct identification of the object and avoid the taking of improper measures based upon a mistaken impression as to the object's true nature.

In a preferred embodiment of the present invention, an optical unit is provided which is in the general form of a telescope. This unit includes an eyepiece through which an airborne observer views an object on the surface, and within the unit is located a transparent reticle mounted in the optical path of light reaching the observer from the viewed object. The observer consequently sees an image of the object through the reticle, the latter in one embodiment of the invention having inscribed upon its surface both the alignment marker (which is linear in nature) and also a plurality of indicia. The latter are arranged in generally parallel relationship so as to intersect the alignment marker at points which are respectively spaced from one another by amounts representing a given distance on the surface. In another embodiment of the invention the alignment marker is carried by a fixed portion of the optical unit, the observer seeing this marker superimposed upon the indicia of the reticle. When the object is viewed through the reticle after the unit has been oriented so that the linear marker is optically aligned with that particular dimension of the object which is sought, then the object image will subtend a number of the points of apparent intersection between the alignment marker and the indicia, the number of such points thus subtended being a measure of the actual length of the object. This measurement will be an accurate representation of the dimension desired, since the indicia of the reticle are initially inscribed thereon to take into account the altitude of the aircraft at the time the measurement is taken and also the angle at which the viewing unit is held by the observer with respect to the vertical. The latter compensation is required since a change in the angle of observation correspondingly changes the apparent length of the object being viewed. One disclosed means for correlating the spacing between successive intersection points on the reticle with changes in viewing angle lies in the mounting of the reticle so that it is pivotable about an axis normal to the optical axis of the viewing unit, and then adding to the reticle gravity-controlled means for shifting the position thereof with respect to the vertical during the time that the optical axis of the viewing unit undergoes changes due to manual manipulation by the observer. As a consequence of such a novel design, changes in viewing angle are automatically compensated for by changes in spacing of the indicia by means of which the length (or other dimensional measurement) of the object is determined.

One object of the present invention, therefore, is to provide a simple and effective device by means of which an observer in an aircraft having a known altitude may determine the size of an object on the surface regardless of the angle made by such object with the vertical at the time the object is sighted by the individual making the observation.

A further object of the invention is to provide a sighting device for use by an observer in an aircraft by means of which a particular dimension of the surface object may be determined regardless of the location of such object within the field of view of the observer.

An additional object of the invention is to provide a sighting device for use on aircraft, the device including a transparent reticle having inscribed thereon indicia the relative spacing of which is a function both of the angle of observation and the altitude of the aircraft at the time the observation is made.

Other objects and many of the attendant advantages of this invention will be readily appreciated as the same become better understood by reference to the following detailed description when considered in connection with the accompanying drawings wherein.

Figure 1:
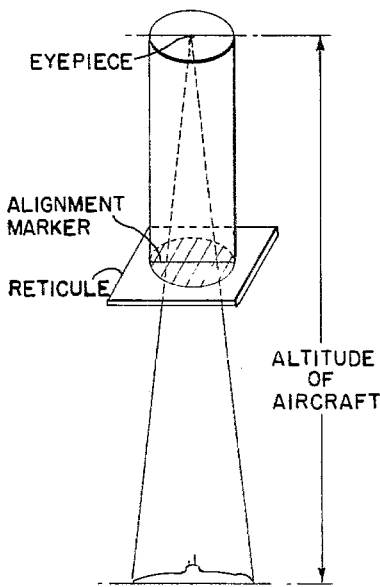
FIG. 1 is a schematic illustration of a device embodying the principles of the present invention in their most basic form.

Referring now to the drawings, there is shown in FIG. 1 one embodiment of the invention which may be employed on an aircraft to determine some particular dimension of a surface object when that object is located directly below the observer. Under such conditions, the angle made by the longitudinal, or optical, axis of the viewing unit is zero degrees with reference to a line drawn vertically between the observer and the surface. The viewing device of this embodiment consequently comprises a tubular body member 10 having at one longitudinal extremity thereof an eyepiece 12 and at the other extremity thereof a transparent reticule 14. If this viewing device of FIG. 1 is held by an observer located on an aircraft, the altitude of which above the surface is known, then, by orienting the viewing device so that the longitudinal axis of the tubular housing 10 is vertical, the observer may view a surface object (such as a submarine 16) through the transparent reticule 14. Light from the object 16 as depicted in FIG. 1 will be in the form of a triangle the sides of which are defined by the boundary lines 18 and the apex of which coincides with the eyepiece 12 of the viewing device. The reticule 14 has inscribed thereon an alignment marker 20 which is linear in nature as well as a plurality of transverse indicia 22 the form and spacing of which are determined in the following manner.

Figure 2:
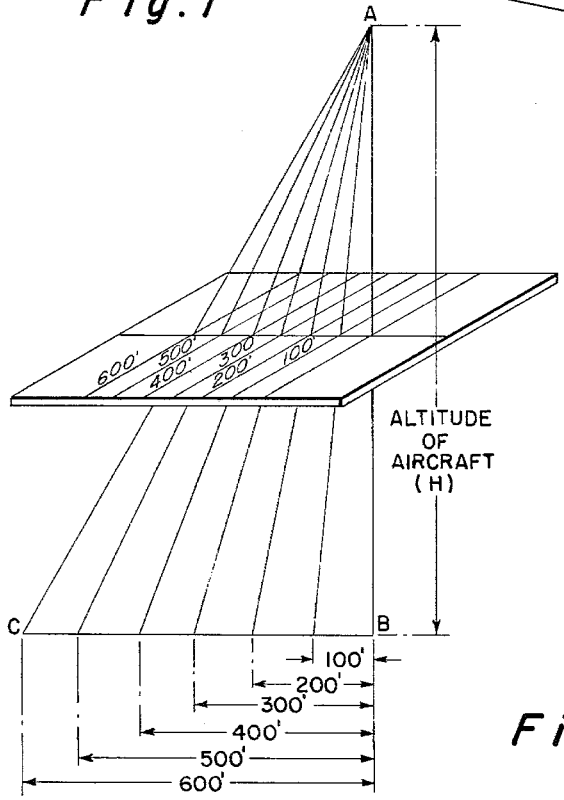
FIG. 2 illustrates the manner in which the spacing of the indicia in the device of FIG. 1 is determined.

It will be appreciated from an inspection of FIG. 1 that the apparent size of the surface object 16 as viewed through the eyepiece 12 of the optical unit will be a function of the altitude of the aircraft on which the observer making use of the optical unit is located. Consequently, any determination of object size must take into account this factor of aircraft altitude. In FIG. 2 is shown geometrically one method by which the spacing of the indicia 22 of FIG. 1 is determined. If the aircraft carrying the observer has a known altitude H (represented by the vertical line AB) and if a given distance BC on the surface is divided into equal increments (such as the 100' increments illustrated in FIG. 2) then lines drawn between these individual increments and the viewpoint A will form a series of triangles, the hypotenuse of each triangle having a different slope with reference to the horizontal. It will be apparent that the spacing between the lines drawn from the surface to the observation point A will gradually decrease with altitude, and that, at any given height above the surface, such lines will pass through a transparent horizontal plate (the reticule 14) at points which are equidistant from one another. If the ground line BC of FIG. 2 is taken to represent the major axis of an object such as the submarine 16 of FIG. 1, then an index marker in FIG. 2 which interconnects the points at which the increment lines 24 pass through the transparent plate 14 will correspond to the alignment marker 20 of FIG. 1. From these points of intersection of the increment lines 24 and the index or alignment marker 20, it is possible to draw indicia 22 each of which is parallel to the remaining indicia and also normal (perpendicular) to the alignment marker 20. Since each individual one of the indicia 22 represents an extremity of one of the incremental segments of the ground line BC, the indicia may be correspondingly numbered or otherwise correlated to such ground segments. If the latter are in steps of 100', as shown in the illustrated example, then each of the indicia 22 may also represent a step of 100'.

It will now be appreciated that an observer in an aircraft holding the viewing unit vertically so that the surface object 16 is viewed through the eyepiece 12, will see the image of the object through the transparent reticule 14, and, furthermore, when the alignment marker 20 is brought into positional coincidence with that dimension of the object 16 which is to be determined (in this case the over-all length of the submarine) then the latter will subtend a number of the points of intersection of adjacent indicia with the alignment marker. If one extremity of the object is aligned with a particular increment line representing the vertical path AB in FIG. 2, then the opposite extremity of the object to be measured will lie at a point along the scale formed by the indicia, and such point may be readily determined by noting the number on the particular indicia proximate thereto. It is thus possible to readily estimate any particular dimension of an object by aligning the marker 20 therewith and reading off the length of the object from the numbered indicia without the necessity of converting this reading into any other form or taking any other positional factors into account.

Figure 3:
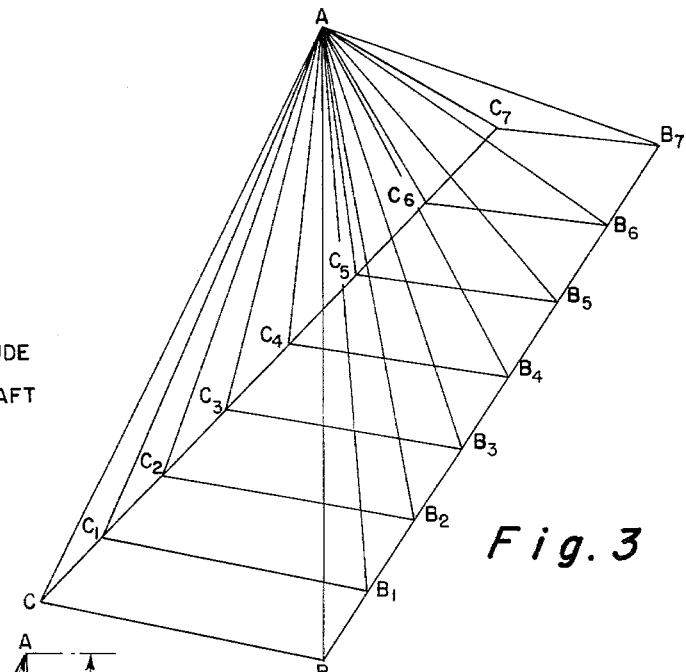
FIG. 3 illustrates geometrically the manner in which the spacing of the indicia of the device of FIG. 1 must be modified when the viewing angle is other than zero degrees with respect to the vertical.

It will be recognized, however, that the method of determining the length of a surface object just described is only practicable when an object lies in a position directly below an aircraft, or in other words, when the optical axis of the viewing unit is vertical. It much more frequently happens, however, that the object to be investigated does not lie directly below the aircraft. In such cases any reading obtained by employing the method just described would not be accurate, and it is consequently necessary to modify the arrangement of FIG. 1 in the following manner:

In FIG. 3 of the drawings is a geometrical representation of the manner in which the apparent length of a surface object changes when the angle of observation departs from the vertical. This showing of FIG. 3 is made up of a series of triangles, and it will be noted that the foremost triangle ABC corresponds to the triangle ABC of FIG. 2. All of the triangles included in FIG. 3 are presented isometrically, and successive triangles $B_1AC_1$, $B_2AC_2$, etc. show the observing angle gradually increasing in magnitude as it departs from the vertical. Obviously the real ground distance BC (or, in other words, the actual length of an observed object) does not change, and the observing height AB is also assumed to be a constant. However, as the angle of observation departs from the vertical (from angle BAC to $B_7AC_7$, for example) then the length of the line BC appears shorter to the observer as the angle of observation increases. This apparent decrease in object length must accordingly be compensated for if inaccuracies in reading are to be avoided.

Figure 4:
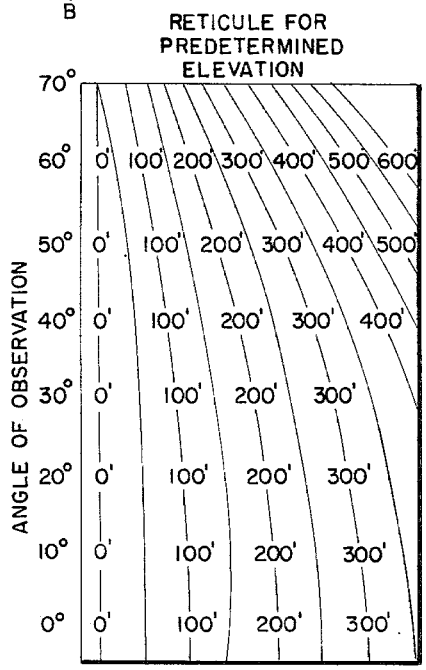
FIG. 4 illustrates a reticule in which the spacing of the indicia is in accordance with the information derived from FIG. 3, the reticule being intended for use when the observation is taken at a predetermined altitude.

In FIG. 4 is illustrated a reticule made up somewhat along the lines of the reticule of FIG. 2 but which takes into account a change in apparent object length at different angles of observation with a constant assumed aircraft altitude. Since the apparent length of the viewed surface object decreases as a function of increases in observation angle, as shown by FIG. 3, then any reticule usable throughout the entire range of observation from the aircraft on which it is carried must correlate such apparent changes in object length with the spacing of the indicia from which such length is to be ascertained. Consequently, the indicia 22 of FIGS. 1 and 2 are no longer inscribed to be linear in nature, but instead possess a curvilinear form such that the spacing between adjacent indicia gradually decreases from a viewing angle of zero degrees (vertical) to a viewing angle of 70°, which represents the maximum practicable angle of observation at which the unit may be utilized. Assuming a constant height of, say, 1000' for the observing aircraft, then the apparent length of a surface object directly below the aircraft will gradually decrease at a rate indicated by the change in spacing between adjacent indicia as illustrated in FIG. 4.

Figure 5:
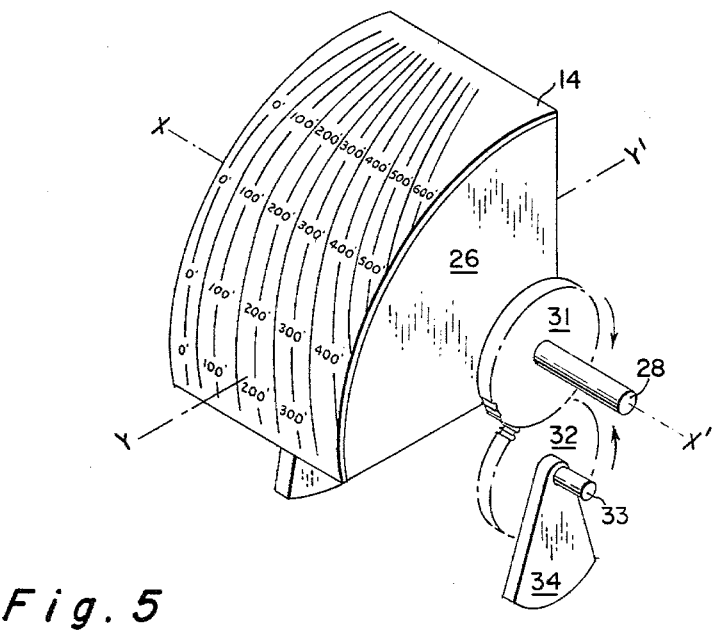
FIG. 5 illustrates the reticule of FIG. 4 when the reticule is applied to form a nonlinear surface portion of a device intended for limited rotation about an axis X–X'.
Figure 6:
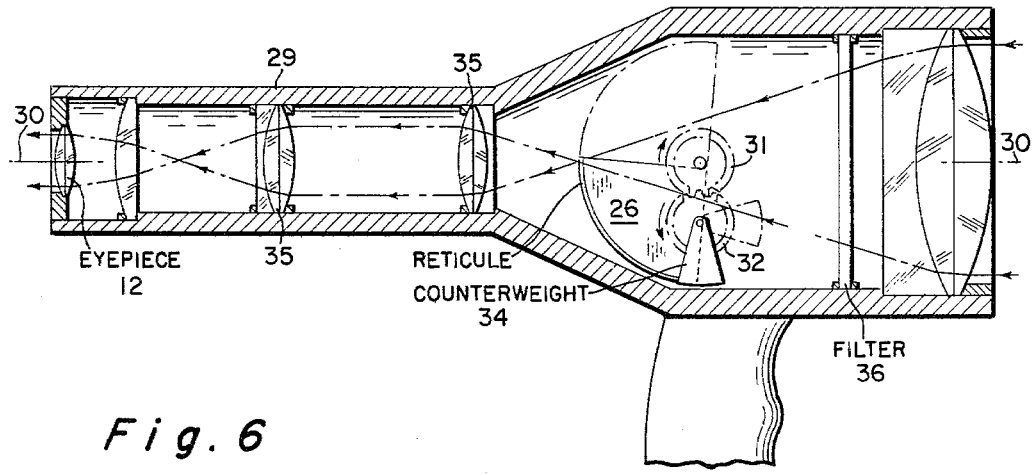
FIG. 6 illustrates in cross section a viewing unit in accordance with the present invention, such unit incorporating the rotatable reticule of FIG. 5.

Obviously some means is desirable whereby an observer utilizing a device such as shown in FIG. 1 will be able to take advantage of the accuracy provided by the change in indicia spacing of FIG. 4 during the time that he is observing ground objects at different viewing angles. While this could be accomplished by shifting the position of the reticule 14 of FIG. 1 laterally with respect to the optical axis of the unit, such an expedient is not practicable, since the actual angle of observation at any particular instant of time is not always readily ascertained and furthermore, the lateral position of the reticule would have to be constantly adjusted manually each time that the viewing angle changed. One preferred method of automatically bringing about such a positional change is illustrated in FIG. 6, such figure representing a practical embodiment of applicants' concept which has proven to be particularly useful in actual practice. In order to place a transparent reticule (which has been designed in accordance with FIG. 4) in such form that it may be used in the device of FIG. 6, the reticule is bent so that the surface thereof is cylindrical over an arc of slightly more than 90°. As shown in FIG. 5, the reticule thus configured is held in position by a pair of spaced-apart arcuate plates 26 which are pivotally mounted on a shaft 28 and freely rotatable about an axis X–X', this axis of rotation lying normal to the axis of observation Y–Y'. The latter is the optical axis 30 of the viewing unit of FIG. 6, as well as the longitudinal axis of the tubular housing 29.

For reasons which will subsequently become apparent, it is desired that the reticule 14 change its position relative to the body of the viewing unit when the latter is moved so that the viewing angle changes. In other words, when the viewing unit to be described in connection with FIG. 6 is actuated about a transverse axis corresponding to the axis X–X' about which the reticule 14 of FIG. 5 is rotatable, the reticule should also rotate but in an opposite direction. To achieve this result, the shaft 28 has attached thereto a gear 31 meshing with a further gear 32 carried on a shaft 33 supported by housing 29 in parallel relationship with shaft 28. Shaft 33 also carries a counterweight 34 intended to remain in vertical position at all times. The force of gravity acting upon the counterweight 34 causes the gears 31–32 to rotate reticule 14 in a direction about axis X–X' which is opposite to the direction in which the optical axis Y–Y' of the device of FIG. 6 tilts in response to manual actuation of the unit. As the viewing unit is depressed or elevated by the observer through its effective range, the counterweight 34 thus causes the reticule 14 to assume a position such that the optical axis 30 of the unit passes through a point on the reticule 14 indicative of the angle made by such optical axis 30 with the vertical at any given instant of time.

Although a pair of gears 31–32 has been described as constituting part of the means by which reticule 14 is rotated about axis X–X' as the unit of FIG. 6 is raised or lowered to vary the angle by which a surface object is viewed by an observer, it may be desirable to allow the reticule to remain in a constant position during any tilting of the unit, while at the same time having the sighting axis Y–Y' of the assembly intersect the indicia at different points to yield data in which changes in viewing angle are compensated for. This can be accomplished by reversing the position of the indicia of FIG. 5 so that the lines are separated by a greater distance at the top than at the bottom. If such is done, the reticule in its position as shown in broken lines in FIG. 6 will constitute its position when the viewing unit is held substantially horizontally and the counterweight 34 will be fixedly attached thereto so that no relative motion occurs therebetween. As the unit is tilted to vertical position, the counterweight will hold the position of reticule 14 constant, the optical axis Y–Y' of the assembly then passing through that portion of the reticule where the indicia are farthest apart.

In addition to the usual inverting lenses 35 in FIG. 6, the assembly may include a polarizing filter 36 to eliminate as far as possible glare resulting from excessive illumination.

The change in position of both the counterweight 34 and the reticule 14 as the unit of FIG. 6 is tilted between horizontal and vertical positions is shown by the broken lines. Such a change in position of the reticule structure with respect to the remainder of the viewing unit brings about a change in the data obtained from the reticule in a manner brought out by FIGS. 7 through 10. In these latter figures, the alignment marker 20 is carried on some fixed portion of the housing so that the position of this marker with respect to the indicia 22 shifts as a function of positional changes in the observing angle. With this in mind, it will be noted that when the unit of FIG. 6 is held in the vertical position so that the alignment marker 20 represents an angle of zero degrees with the vertical, then the surface object 16 subtends a distance equal to about four and two-thirds spaces as defined by the indicia. With each such space representing a surface distance of 50' (for example) it is apparent that the length of the surface object 16 is approximately 235'.

Figure 9:
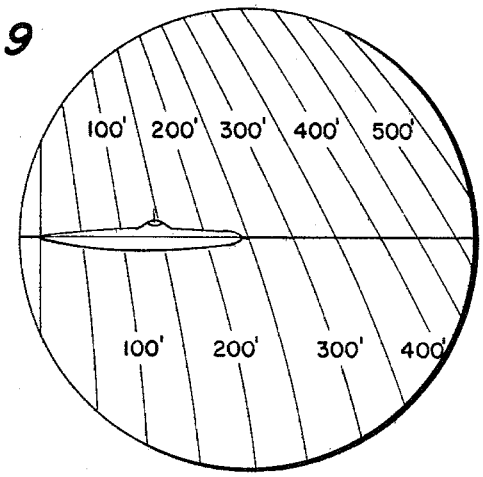
FIGS. 7, 8, 9 and 10 illustrate the manner in which the observed dimensions of a viewed object change when the viewing angle correspondingly changes as, for example, between zero degrees and 70° with respect to the vertical.
Figure 7:
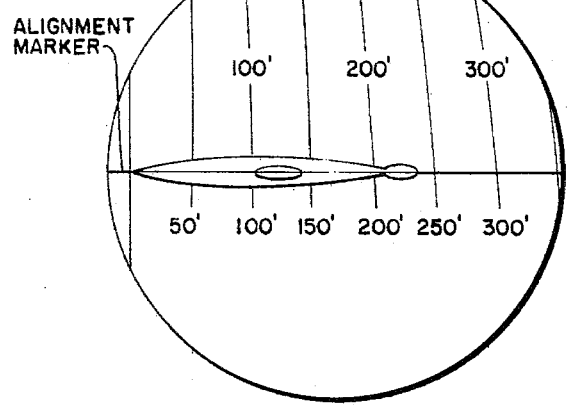
Figure 10:
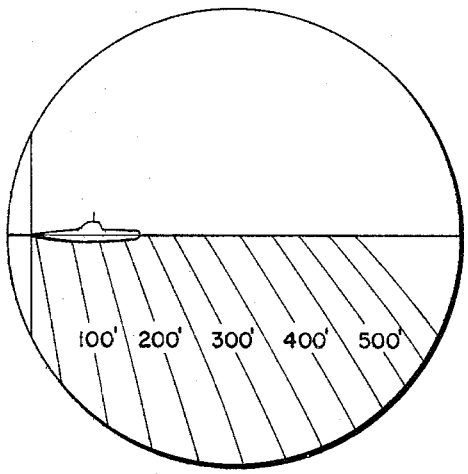
Figure 8:
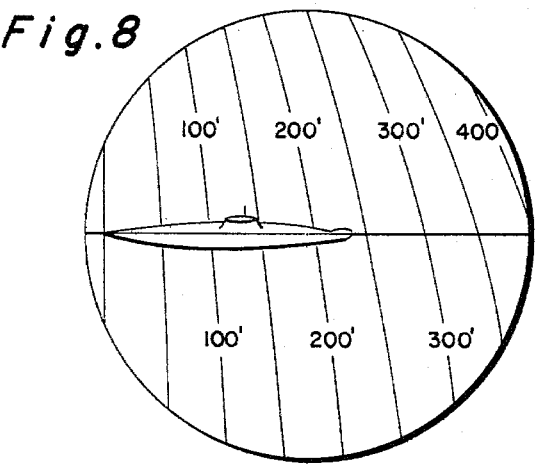

Should it be necessary to sight the surface object 16 at a viewing angle of 30°, then elevating the unit of FIG. 6 will cause the object 16 to be observed through a 30° position of observation, and the object will appear as shown in FIG. 8. It will be noted that although the apparent size of the object 16 is considerably less than in FIG. 7, nevertheless a reading of the indicia will still yield an object length of 235', the same result obtained by reading the indicia of FIG. 7. Similarly, FIG. 9 shows the effect of increasing the viewing angle to 50°, while FIG. 10 shows the object 16 being observed through the maximum practicable angle of 70°. In each of these cases the reading obtained is identical regardless of the change in viewing angle.

It may be mentioned at this point that although the preceding discussion has assumed a constant aircraft altitude, such, for example, as 1000', it is not necessary to insert a different reticule should the aircraft altitude change. It is readily possible to utilize a conversion factor for altitudes for other than that for which the reticule was constructed. For example, if the altitude of the aircraft increases to 2000', the reading obtained from the reticule is valid if multiplied by a factor of 2. Similarly, if the aircraft altitude is 2500', then the conversion factor is 2.5, etc. Of course, different reticules may be employed at different altitudes if such an expedient is more feasible.

In the event that the observer does not hold the viewing unit so that the axis of rotation of the reticule (the axis X–X') is precisely horizontal, then a certain transverse force is applied to the reticule which may in some cases affect the reading obtained. If this is objectionable, the reticule unit of FIG. 5 may be mounted in a gimbal to overcome such force. If small oscillations of the reticule cannot be tolerated, the counterweight 34 may be mounted in a body of oil or other viscous fluid. Furthermore, the image seen by the observer through the eyepiece 12 of the device may be permanently recorded by diverting a portion of the light passing through the assembly to a camera or other photographic device.

Obviously many modifications and variations of the present invention are possible in the light of the above teachings. It is, therefore, to be understood that within the scope of the appended claims the invention may be practiced otherwise than as specifically described.

We claim:

1. A device for facilitating the determination by an observer in an aircraft having a known altitude of the size of an object on the surface, said device being capable of manipulation by said observer and comprising a viewing unit of generally tubular configuration and having an optical axis coinciding with its longitudinal axis, said unit including an eyepiece at one extremity thereof through which the surface object may be viewed by said observer and a fixed alignment marker in the optical path of light passing therethrough, a transparent reticule, and means for mounting said transparent reticule for relative movement with respect to the remainder of said viewing unit and in the optical path of light passing therethrough, and a gravity-controlled member connected to said reticule and acting to maintain the latter in a fixed position with respect to the vertical as the device is manipulated by said observer, said transparent reticule having inscribed thereon a set of spaced-apart indicia each of which optically intersects said fixed alignment marker in the field presented to an observer holding said device and viewing said surface object through said eyepiece, the spacing between the apparent points of intersection of adjacent indicia and said fixed alignment marker varying as a function of changes in the relative position of said movable reticule with respect to the remainder of said viewing unit when the angle made by the optical axis of said unit with the vertical varies upon manipulation of said device by said observer, so that, when said fixed marker is optically aligned by said observer with the particular dimension of the surface object to be determined, then the image of the object as viewed by the observer through said eyepiece will subtend a number of the apparent points of intersection between said marker and said indicia, the number of points of intersection so subtended being a measure of that particular dimension of the object to be determined regardless of the angle made by the optical axis of the manually-held viewing unit with the vertical at the time that the observation is made.

2. A device according to claim 1 in which the indicia inscribed on said transparent reticule are each curvilinear in nature and so related that the spacing between adjacent indicia varies as viewed along the said optical axis when the relative position of said reticule changes with respect to the remainder of said viewing unit.

3. A device according to claim 2 in which the said reticule is mounted for relative movement with respect to the remainder of said viewing unit on an axis normal to the optical axis of the viewing unit.

4. A device according to claim 1 in which the said reticule is mounted so that the surface thereof on which the said set of indicia is transcribed forms part of a cylinder of revolution, the said axis on which the reticule moves with respect to the remainder of said viewing unit being the longitudinal axis of the cylinder of which the reticule forms a surface portion.

References Cited by the Examiner

UNITED STATES PATENTS

| 1,631,635 | 6/27 | Kauch | 33—46.5 |
| 2,154,454 | 4/39 | Joyce | 33—51 |
| 2,734,273 | 2/56 | Blindenbacher et al. | 33—64 |

FOREIGN PATENTS

| 117,096 | 7/18 | Great Britain. |
| 506,920 | 6/39 | Great Britain. |

LEO SMILOW, *Primary Examiner.*

SAMUEL BOYD, *Examiner.*